United States Patent
Hamilton et al.

(10) Patent No.: US 10,953,847 B2
(45) Date of Patent: Mar. 23, 2021

(54) HEIGHT ADJUSTERS WITH ANTI-CINCH FEATURES FOR OCCUPANT RESTRAINT SYSTEMS

(71) Applicant: Shield Restraint Systems, Inc., Elkhart, IN (US)

(72) Inventors: Ruth Ann Hamilton, Elkhart, IN (US); Wayne Deyo Carter, Elkhart, IN (US); Matt Robert McCollough, Elkhart, IN (US); Mikail Paulo Gagasca Santiaguel, Elkhart, IN (US); Collyn William Bennett, Elkhart, IN (US)

(73) Assignee: Shield Restraint Systems, Elkhart, IN (US)

( * ) Notice: Subject to any disclaimer, the term of this patent is extended or adjusted under 35 U.S.C. 154(b) by 105 days.

(21) Appl. No.: 16/293,533

(22) Filed: Mar. 5, 2019

(65) Prior Publication Data
US 2019/0275983 A1   Sep. 12, 2019

Related U.S. Application Data

(60) Provisional application No. 62/639,258, filed on Mar. 6, 2018.

(51) Int. Cl.
*B60R 22/20* (2006.01)
*B60R 22/28* (2006.01)
*B60R 22/18* (2006.01)

(52) U.S. Cl.
CPC ............ *B60R 22/202* (2013.01); *B60R 22/28* (2013.01); *B60R 2022/1818* (2013.01)

(58) Field of Classification Search
CPC .................. B60R 22/202; B60R 22/28; B60R 2022/1818; B60R 22/201; B60R 22/30; B60R 22/203; B60R 21/055
See application file for complete search history.

(56) References Cited

U.S. PATENT DOCUMENTS

| 2,443,191 A |   | 6/1948 | Miller |
| 3,074,760 A | * | 1/1963 | Hodgekin ............... B60R 22/16 |
|   |   |   | 297/472 |

(Continued)

FOREIGN PATENT DOCUMENTS

| CA | 2086479 | 7/1993 |
| CA | 2038122 | 11/2000 |

(Continued)

OTHER PUBLICATIONS

Child Restraint Systems, Department of Aviation Administration, Federal Aviation Adm. 14 CFR, Aug. 2005.

(Continued)

*Primary Examiner* — Frank B Vanaman
(74) *Attorney, Agent, or Firm* — Perkins Coie LLP

(57) ABSTRACT

Shock absorbing seat belt height adjusters for use with vehicle occupant restraint systems, and associated systems and methods. In one embodiment, a shock absorbing height adjuster can be attached to a vehicle frame between an upper anchor point and a lower anchor point adjacent to an occupant's shoulder. The height adjuster can include a web clamp that locates a D-ring for positioning a shoulder web portion of the restraint web at a desired height that is comfortable for the occupant. Additionally, the height adjuster can include an anti-cinch feature that can elastically extend in response to tension loads in the shoulder web portion, thereby reducing shock loads from being transmitted to the seat occupant from the shoulder web portion.

20 Claims, 8 Drawing Sheets

(56) References Cited

U.S. PATENT DOCUMENTS

| | | | |
|---|---|---|---|
| 3,409,327 A * | 11/1968 | Radke | B60R 22/28 |
| | | | 297/472 |
| 3,550,957 A | 12/1970 | Booth | |
| 3,563,498 A | 2/1971 | Haile | |
| 3,804,698 A | 4/1974 | Kinloch | |
| 4,027,905 A | 6/1977 | Shimogawa | |
| 4,060,278 A | 11/1977 | Maeyerspeer | |
| 4,243,266 A | 1/1981 | Anderson | |
| 4,527,830 A | 7/1985 | Meyers | |
| 4,552,407 A * | 11/1985 | Takada | B60R 22/1855 |
| | | | 24/579.11 |
| 4,624,479 A | 11/1986 | Grunewald | |
| 4,640,550 A | 2/1987 | Håkansson | |
| 4,660,889 A | 4/1987 | Anthony et al. | |
| 4,679,852 A | 7/1987 | Anthony et al. | |
| 4,738,485 A | 4/1988 | Rumpf | |
| 4,787,677 A | 11/1988 | Reighter | |
| 4,826,246 A | 5/1989 | Meeker | |
| 4,884,652 A | 12/1989 | Vollmer | |
| 4,948,199 A | 8/1990 | Weller | |
| 5,031,962 A | 7/1991 | Lee | |
| 5,039,169 A | 8/1991 | Bougher et al. | |
| 5,061,012 A | 10/1991 | Parker et al. | |
| 5,113,981 A | 5/1992 | Lantz | |
| 5,143,420 A | 8/1992 | Switlik | |
| 5,219,203 A | 7/1993 | Switlik | |
| 5,265,828 A | 11/1993 | Bennington | |
| 5,283,933 A | 2/1994 | Wiseman et al. | |
| 5,286,090 A | 2/1994 | Templin et al. | |
| 5,333,935 A | 8/1994 | DiPaola | |
| 5,366,243 A | 11/1994 | Ray | |
| 5,377,386 A | 1/1995 | Griffith | |
| 5,383,708 A | 1/1995 | Nagasaka et al. | |
| 5,466,044 A | 11/1995 | Barley et al. | |
| 5,487,588 A | 1/1996 | Burleigh et al. | |
| 5,511,856 A | 4/1996 | Merrick et al. | |
| 5,524,928 A | 6/1996 | Monagas | |
| 5,524,965 A | 6/1996 | Barley | |
| 5,529,343 A | 6/1996 | Klink | |
| 5,536,066 A | 7/1996 | Sedlack | |
| 5,560,565 A | 10/1996 | Merrick et al. | |
| 5,566,978 A | 10/1996 | Fleming | |
| 5,588,189 A | 12/1996 | Gorman et al. | |
| 5,605,375 A | 2/1997 | Friedrich et al. | |
| 5,606,783 A | 3/1997 | Gillis et al. | |
| 5,609,367 A | 3/1997 | Eusebi et al. | |
| 5,611,597 A | 3/1997 | Lanz | |
| 5,628,529 A | 5/1997 | Golz | |
| 5,628,548 A | 5/1997 | Lacoste | |
| 5,669,663 A | 9/1997 | Feuerherdt | |
| 5,695,243 A | 12/1997 | Anthony et al. | |
| 5,700,034 A * | 12/1997 | Lane, Jr. | B60R 21/01 |
| | | | 280/805 |
| 5,732,974 A | 3/1998 | Sayles | |
| 5,779,319 A | 7/1998 | Merrick | |
| 5,816,651 A | 10/1998 | Feuerherdt | |
| 5,839,793 A | 11/1998 | Merrick et al. | |
| 5,860,675 A | 1/1999 | Muller | |
| 5,873,599 A | 2/1999 | Bauer et al. | |
| 5,873,635 A | 2/1999 | Merrick | |
| 5,890,762 A | 4/1999 | Yoshida | |
| 5,908,223 A | 6/1999 | Miller | |
| 5,915,787 A | 6/1999 | Brookman | |
| 5,918,834 A | 7/1999 | Siegrist | |
| 5,931,502 A | 8/1999 | Frank | |
| 5,941,601 A | 8/1999 | Scott et al. | |
| 5,979,982 A | 11/1999 | Nakagawa | |
| 5,996,192 A | 12/1999 | Haines et al. | |
| 6,017,087 A | 1/2000 | Anthony et al. | |
| 6,030,046 A | 2/2000 | Dorow | |
| 6,082,819 A | 7/2000 | Jackson | |
| 6,123,391 A | 9/2000 | Boelstler et al. | |
| 6,182,783 B1 | 2/2001 | Bayley | |
| 6,183,044 B1 | 2/2001 | Koyanagi et al. | |
| 6,209,957 B1 | 4/2001 | Baloga et al. | |
| 6,220,662 B1 | 4/2001 | Franco-Vila et al. | |
| 6,260,925 B1 | 7/2001 | Miller | |
| 6,343,837 B1 | 2/2002 | Gage | |
| 6,357,790 B1 | 3/2002 | Swann et al. | |
| 6,402,251 B1 | 6/2002 | Stoll | |
| 6,425,632 B1 | 6/2002 | Anthony et al. | |
| 6,447,060 B1 | 9/2002 | Vila et al. | |
| 6,450,576 B1 | 9/2002 | Rhein et al. | |
| 6,463,638 B1 | 10/2002 | Pontaoe | |
| 6,517,154 B2 | 2/2003 | Sawamoto | |
| 6,543,722 B1 | 4/2003 | Parrow et al. | |
| 6,561,588 B1 | 5/2003 | Brady | |
| 6,616,242 B1 | 9/2003 | Stoll | |
| 6,669,288 B2 | 12/2003 | Nakagawa et al. | |
| 6,694,577 B2 | 2/2004 | Di Perrero | |
| 6,764,135 B2 | 7/2004 | Sasaki et al. | |
| 6,767,057 B2 | 7/2004 | Neelis | |
| 6,767,058 B2 | 7/2004 | McClellan-Derrickson | |
| 6,772,973 B2 | 8/2004 | Fujii et al. | |
| 6,786,510 B2 | 9/2004 | Roychoudhury | |
| 6,802,537 B1 | 10/2004 | Tolefsen | |
| 6,820,310 B2 | 11/2004 | Woodard et al. | |
| 6,962,394 B2 | 11/2005 | Anthony et al. | |
| 6,979,057 B2 | 12/2005 | Sedlack | |
| 7,011,341 B2 | 3/2006 | Herberg et al. | |
| 7,029,067 B2 | 4/2006 | Vits et al. | |
| 7,044,548 B2 | 5/2006 | Mullen et al. | |
| 7,077,475 B2 | 6/2006 | Boyle | |
| 7,144,085 B2 | 12/2006 | Vits et al. | |
| 7,159,285 B2 | 1/2007 | Karlsson | |
| 7,201,399 B2 | 4/2007 | Frank et al. | |
| 7,232,154 B2 | 6/2007 | Desmarais et al. | |
| 7,246,854 B2 | 7/2007 | Dingman et al. | |
| 7,278,684 B2 | 10/2007 | Boyle | |
| 7,347,494 B2 | 3/2008 | Boyle et al. | |
| 7,464,989 B2 | 12/2008 | Merrill | |
| 7,488,038 B2 | 2/2009 | Boyle et al. | |
| 7,770,969 B2 | 8/2010 | Boyle et al. | |
| 7,861,341 B2 | 1/2011 | Ayette | |
| 7,866,702 B2 | 1/2011 | Murphy | |
| 8,002,358 B2 | 8/2011 | Marriott | |
| 8,800,735 B2 | 8/2014 | Ruthenowski | |
| 8,820,789 B2 | 9/2014 | Merrill | |
| 9,004,606 B2 | 4/2015 | Bostrom | |
| 9,499,121 B2 | 11/2016 | Dingman et al. | |
| 9,623,836 B2 | 4/2017 | Kujawa | |
| 9,738,248 B2 | 8/2017 | Dingman et al. | |
| 9,809,193 B2 | 11/2017 | Marriott et al. | |
| 2002/0000744 A1 | 1/2002 | Maciejczyk | |
| 2002/0043830 A1 | 4/2002 | Sawamoto | |
| 2003/0057750 A1 | 3/2003 | Blackler | |
| 2004/0036345 A1 | 2/2004 | Herberg et al. | |
| 2004/0095004 A1 | 5/2004 | Horton | |
| 2004/0115390 A1 * | 6/2004 | Hess | A63B 29/02 |
| | | | 428/99 |
| 2005/0269846 A1 | 12/2005 | Vits et al. | |
| 2006/0071535 A1 | 4/2006 | Kim | |
| 2006/0082129 A1 | 4/2006 | Dingman et al. | |
| 2006/0082200 A1 | 4/2006 | Woellert et al. | |
| 2006/0103200 A1 | 5/2006 | Dingman et al. | |
| 2007/0013185 A1 | 1/2007 | Desmarais | |
| 2007/0024103 A1 | 2/2007 | Horton et al. | |
| 2007/0046014 A1 | 3/2007 | Glover | |
| 2007/0120001 A1 | 5/2007 | Esler et al. | |
| 2007/0210639 A1 | 9/2007 | Berger | |
| 2008/0012285 A1 | 1/2008 | Holbein et al. | |
| 2008/0072404 A1 | 3/2008 | Wetter | |
| 2008/0100051 A1 | 5/2008 | Bell et al. | |
| 2008/0100122 A1 | 5/2008 | Bell et al. | |
| 2008/0136141 A1 | 6/2008 | Gray | |
| 2008/0136225 A1 | 6/2008 | Murphy et al. | |
| 2008/0203793 A1 | 8/2008 | Boyle et al. | |
| 2008/0303325 A1 | 12/2008 | Scholz | |
| 2010/0219667 A1 | 9/2010 | Merrill et al. | |
| 2010/0253121 A1 | 10/2010 | Buckingham et al. | |
| 2010/0293759 A1 | 11/2010 | Wada | |
| 2011/0133532 A1 | 6/2011 | Zhao | |
| 2012/0054989 A1 * | 3/2012 | Eisinger | B60N 2/2812 |
| | | | 24/168 |

(56) References Cited

U.S. PATENT DOCUMENTS

| | | |
|---|---|---|
| 2012/0181828 A1 | 7/2012 | Cheng |
| 2013/0015690 A1 | 1/2013 | Mendis |
| 2015/0021926 A1 | 1/2015 | Szewczyk et al. |
| 2015/0314749 A1* | 11/2015 | Moker ............... A44B 11/2557 297/464 |
| 2016/0137160 A1* | 5/2016 | Dingman .............. B60R 22/201 280/801.2 |
| 2017/0236395 A1 | 8/2017 | Cech |
| 2017/0267208 A1* | 9/2017 | Marriott ................ B60R 22/203 |
| 2017/0283079 A1 | 10/2017 | Meadows et al. |
| 2018/0170304 A1 | 6/2018 | Wang |
| 2018/0201375 A1 | 7/2018 | Browning |
| 2018/0312134 A1 | 11/2018 | Jessup et al. |
| 2019/0001922 A1 | 1/2019 | Wang |
| 2019/0275982 A1* | 9/2019 | Hamilton ............... B60R 22/202 |
| 2019/0308584 A1 | 10/2019 | Eaton et al. |

FOREIGN PATENT DOCUMENTS

| | | | |
|---|---|---|---|
| CA | 2038505 | 11/2000 | |
| CA | 2450995 | 12/2003 | |
| CA | 2551335 | 12/2006 | |
| CN | 110228443 | 9/2019 | |
| DE | 1288444 | 1/1969 | |
| DE | 2419193 | 11/1975 | |
| DE | 2614769 | 10/1977 | |
| DE | 3900066 | 7/1989 | |
| DE | 40 33 028 A1 * | 4/1992 | ........... B60R 22/201 |
| DE | 19630498 | 2/1998 | |
| DE | 19738430 | 3/1999 | |
| DE | 10253820 | 6/2004 | |
| DE | 102015224611 | 6/2017 | |
| EP | 552570 | 12/1992 | |
| EP | 560184 | 9/1993 | |
| EP | 462930 | 8/1994 | |
| EP | 619201 | 10/1994 | |
| EP | 619202 | 10/1994 | |
| EP | 646491 | 4/1995 | |
| EP | 703113 | 3/1996 | |
| EP | 714806 | 6/1996 | |
| EP | 841209 | 5/1998 | |
| EP | 970842 | 1/2000 | |
| EP | 982182 | 1/2000 | |
| EP | 1059194 | 12/2000 | |
| EP | 1193111 | 4/2002 | |
| EP | 1231100 | 8/2002 | |
| EP | 1472949 | 11/2004 | |
| EP | 1631166 | 9/2008 | |
| EP | 3564077 | 11/2019 | |
| FR | 2857601 | 1/2005 | |
| GB | 2009588 | 6/1979 | |
| GB | 2444591 | 6/2008 | |
| JP | 5254367 | 10/1993 | |
| JP | 10119611 | 5/1998 | |
| JP | 10119612 | 5/1998 | |
| JP | 2001030811 | 2/2001 | |
| JP | 6025361 | * 11/2016 | ............ B60R 22/20 |
| WO | 9702164 | 1/1997 | |
| WO | 03009717 | 2/2003 | |
| WO | 03010024 | 2/2003 | |
| WO | 03010035 | 2/2003 | |
| WO | 2005000625 | 1/2005 | |
| WO | 2005037605 | 4/2005 | |
| WO | 2005102112 | 11/2005 | |
| WO | 2006044559 | 4/2006 | |
| WO | 2006044627 | 4/2006 | |
| WO | 2006044809 | 4/2006 | |
| WO | 2006044830 | 4/2006 | |

OTHER PUBLICATIONS

Improving the Safety of Older Child Passengers, Nov. 2005.
International Search Report and Written Opinion for PCT Application No. PCT/US2007/66476, Applicant: AmSafe Commercial Products, Inc., dated Jan. 25, 2008, 10 pages.
International Search Report and Written Opinion for PCT Application No. PCT/US2009/31613, Applicant: AmSafe Commercial Products, Inc., dated Mar. 3, 2009, 9 pages.
International Search Report and Written Opinion for PCT Application No. PCT/US2009/58806; Applicant: AmSafe, Inc.; dated Jan. 20, 2010, 10 pages.
Restraint Use on Aircraft, American Academy of Pediatrics vol. 108, No. 5, Nov. 2001.
Safefit, Cover N' Carry Car Seat Protector, www.Amazon.com, accessed from internet: Feb. 9, 2006, 3 pages.
Safer Airplane Travel with Babies & Toddlers Fact Sheet, Safe Ride News Publications 2003, accessed from internet: Mar. 16, 2006, 4 pages.
Tiny Air Travelers at Risk, Brad Watson Reports, Jan. 26, 2006.
Ultimate Black Car Seat Travel Bag, www.target.com, accessed from internet: Feb. 9, 2006, 2 pages.
Wheelie Car Seat Travel Bag by JL Childress, www.Go-Baby.com, accessed from internet: Mar. 22, 2006, 2 pages.
International Search Report and Written Opinion for PCT Application No. PCT/US2019/25513, Applicant: Shield Restraint Systems, Inc., dated Jun. 21, 2019, 8 pages.
Translation of DE 102015224611, Published Jun. 8, 2017, accessed at www.espace.com on Aug. 7, 2020 (Year: 2017).

* cited by examiner

HEIGHT ADJUSTERS WITH ANTI-CINCH FEATURES FOR OCCUPANT RESTRAINT SYSTEMS

This application claims the benefit of U.S. Provisional Patent Application No. 62/639,258, titled "HEIGHT ADJUSTERS WITH BUILT-IN ANTI-CINCH FOR OCCUPANT RESTRAINT SYSTEMS," and filed Mar. 6, 2018, the disclosure of which is hereby incorporated by reference in its entirety.

TECHNICAL FIELD

The present disclosure is generally related to web height adjusters for use in vehicle occupant restraint systems.

BACKGROUND

Seat belts for use in cars, trucks, utility task vehicles (UTVs) and other vehicles often include a turning loop or D-ring near the occupant's shoulder to support the shoulder web. Typically the seat belt web will extend upwardly from a retractor, around the D-ring, and then downwardly at an angle across the occupant's torso. In the event of a collision or other rapid deceleration event that causes locking of the retractor, the D-loop acts as a rigid anchor for the shoulder web and resists forward motion of the occupant.

Some situations can require significant tension in the shoulder web to properly restrain the occupant, and this tension can result in substantial discomfort. For example, in recreational utility vehicles (RUVs) or UTVs, aggressive driving in off-road conditions can result in repeated application of high tension loads in the web, causing discomfort and/or fatigue for the operator. U.S. Pat. No. 9,809,193, assigned to Shield Restraint Systems, Inc., discloses shock absorbing height adjusters for use with restraint systems, and is incorporated herein by reference in its entirety.

DETAILED DESCRIPTION

Figure 1:
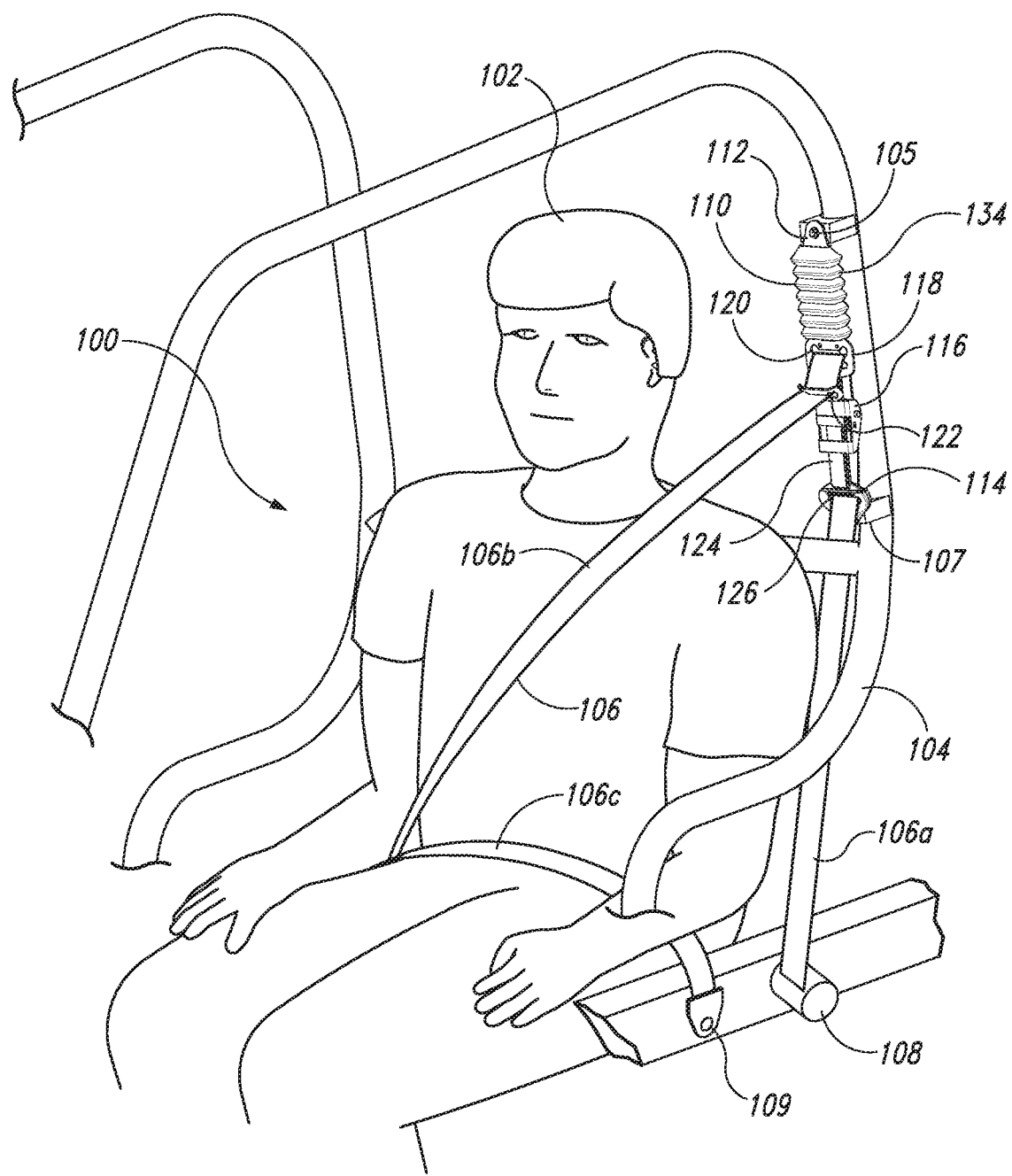
FIG. 1 is an isometric view of a vehicle occupant restraint system having a shock absorbing height adjuster configured in accordance with an embodiment of the present technology.

The following disclosure describes various embodiments of shock absorbing seat belt height adjusters and associated systems and methods. In some embodiments, a shock absorbing height adjuster can be attached to the frame of a vehicle at an upper anchor point and a lower anchor point. The shock absorbing height adjuster can include an anti-cinch feature that is coupled to the upper anchor point and a web strap that extends downwardly from the anti-cinch feature to the lower anchor point. A web clamp can be adjustably positionable at various heights along the web strap extending between the lower anchor point and the anti-cinch feature. As described in greater detail below, a restraint web (e.g., a shoulder web portion of a restraint web) can be routed through a first web aperture proximate the lower anchor point, a second web aperture in a D-ring that attaches the web strap to the anti-cinch feature, and then through a third web aperture in the web clamp before extending downwardly and across the seat occupant's torso. In operation, the seat occupant can adjust the height of the shoulder web portion by moving the web clamp up or down on the web strap to a desired location and then releasably fixing the clamp to the web strap. The anti-cinch feature can include one or more elastic elements that allow the D-ring to move downwardly in response to tension loads in the shoulder web during vehicle operation.

Certain details are set forth in the following description and in FIGS. 1-7 to provide a thorough understanding of various embodiments of the present technology. In other instances, well-known structures, materials, operations and/or systems often associated with vehicle occupant restraint systems, including seat belts, web retractors, buckles, adjusters, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of an occupant restraint system 100 having a shock absorbing height adjuster 110 ("height adjuster") configured in accordance with an embodiment of the present technology. In the illustrated embodiment, the restraint system 100 is mounted to a vehicle (e.g., a UTV) having a vehicle frame 104. The height adjuster 110 is attached to the vehicle frame 104 at an upper anchor point 105 via an upper anchor 112, and at a lower anchor point 107 via a lower anchor 114 (which can also be referred to herein as a two slot D-ring 114). The height adjuster 110 includes a web strap 124 having a lower end portion attached to the two slot D-ring 114 and an upper end portion attached to a three slot D-ring 118. The three slot D-ring 118 is elastically coupled to the upper anchor 112 by means of an anti-cinch feature (not shown in FIG. 1) that is enclosed in a cover 134.

A restraint web 106 can include a first portion 106a that extends upwardly from a web retractor 108 and passes through a web aperture 126 in the two slot D-ring 114. From there, the first web portion 106a extends upwardly behind a web clamp 116 and then through a web aperture 120 in the three slot D-ring 118 before extending downwardly and passing through another web aperture 122 on the front side of the web clamp 116. From the web aperture 122, the web 106 can form a second portion 106b (e.g., a shoulder web portion) that extends downwardly across the torso of a seat occupant 102. The second web portion 106b can slidably pass through a web connector (not shown) that is coupled to a seat belt buckle (also not shown) on one side of the seat occupant 102, before forming a third web portion 106c (e.g., a lap web portion) that extends across the lap of the seat occupant 102 and attaches to an anchor 109. As described in greater detail below, the anti-cinch feature enables the three slot D-ring 118 to move upwardly and downwardly a limited distance in response to tension loads on a restraint web 106.

Figure 2A:
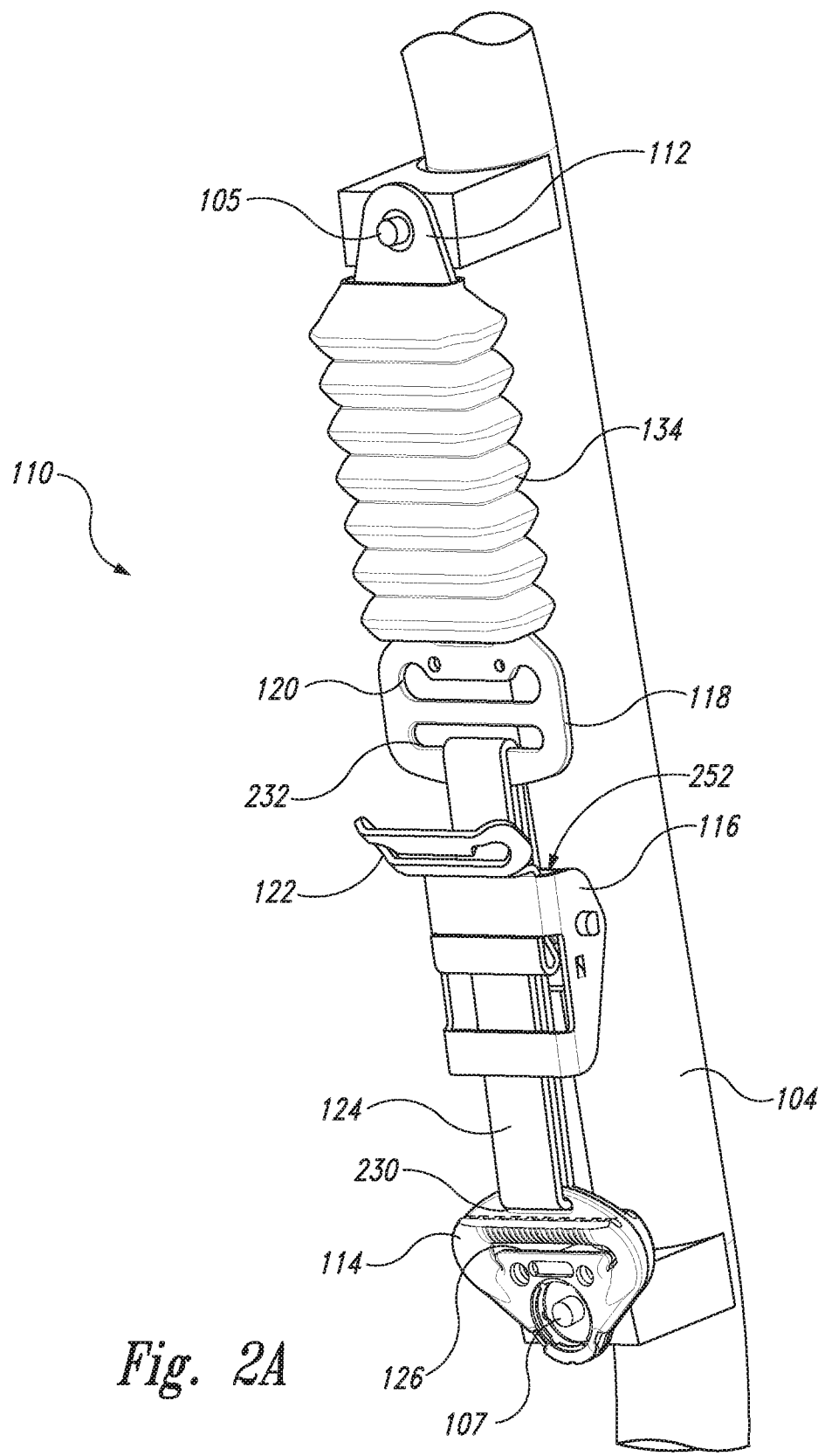
FIG. 2A is an isometric view of the shock absorbing height adjuster of FIG. 1 with the restraint web omitted for purposes of illustration.
Figure 2B:
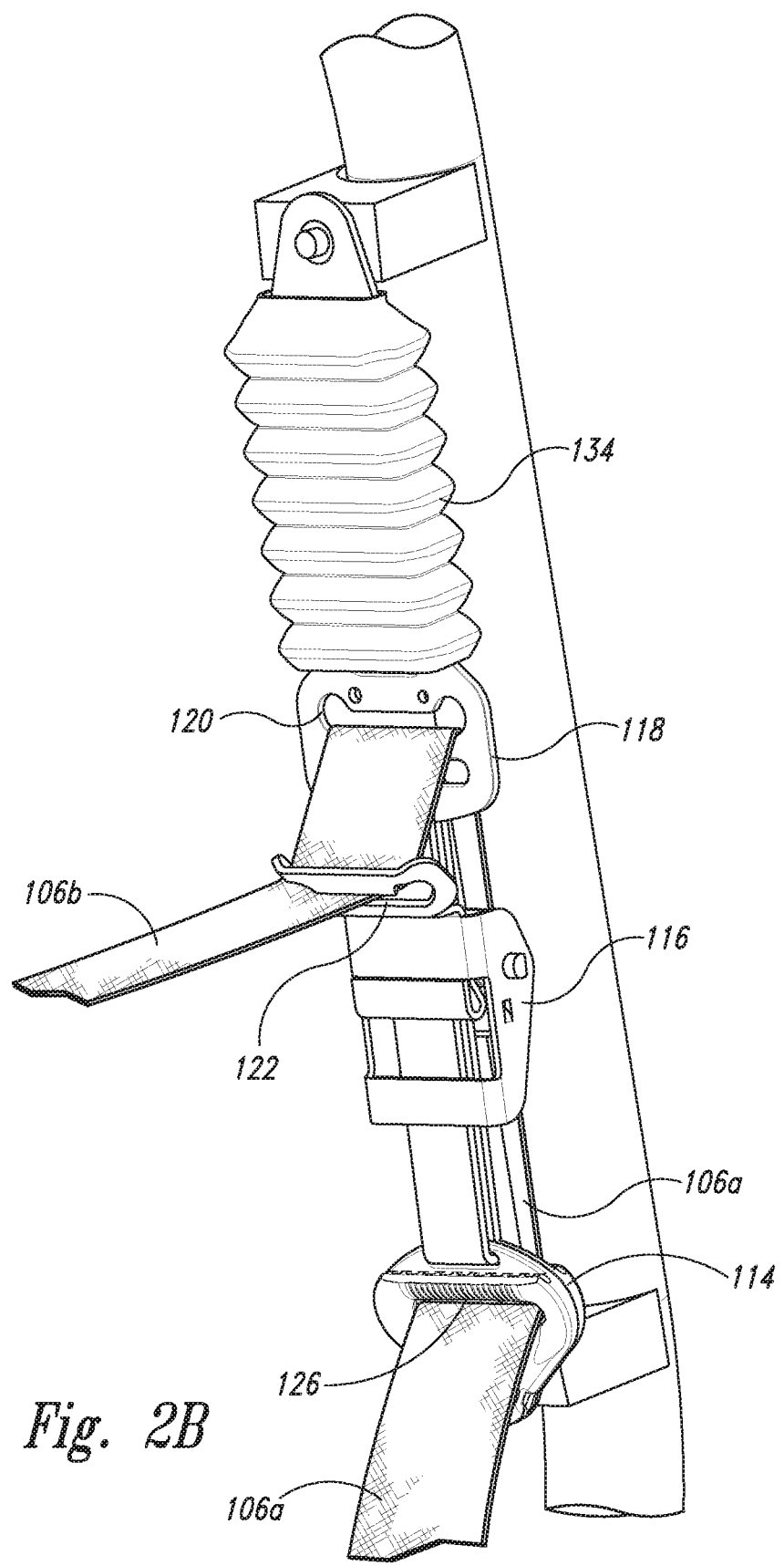
FIG. 2B is an isometric view of the shock absorbing height adjuster with the restraint web installed.
Figure 2C:
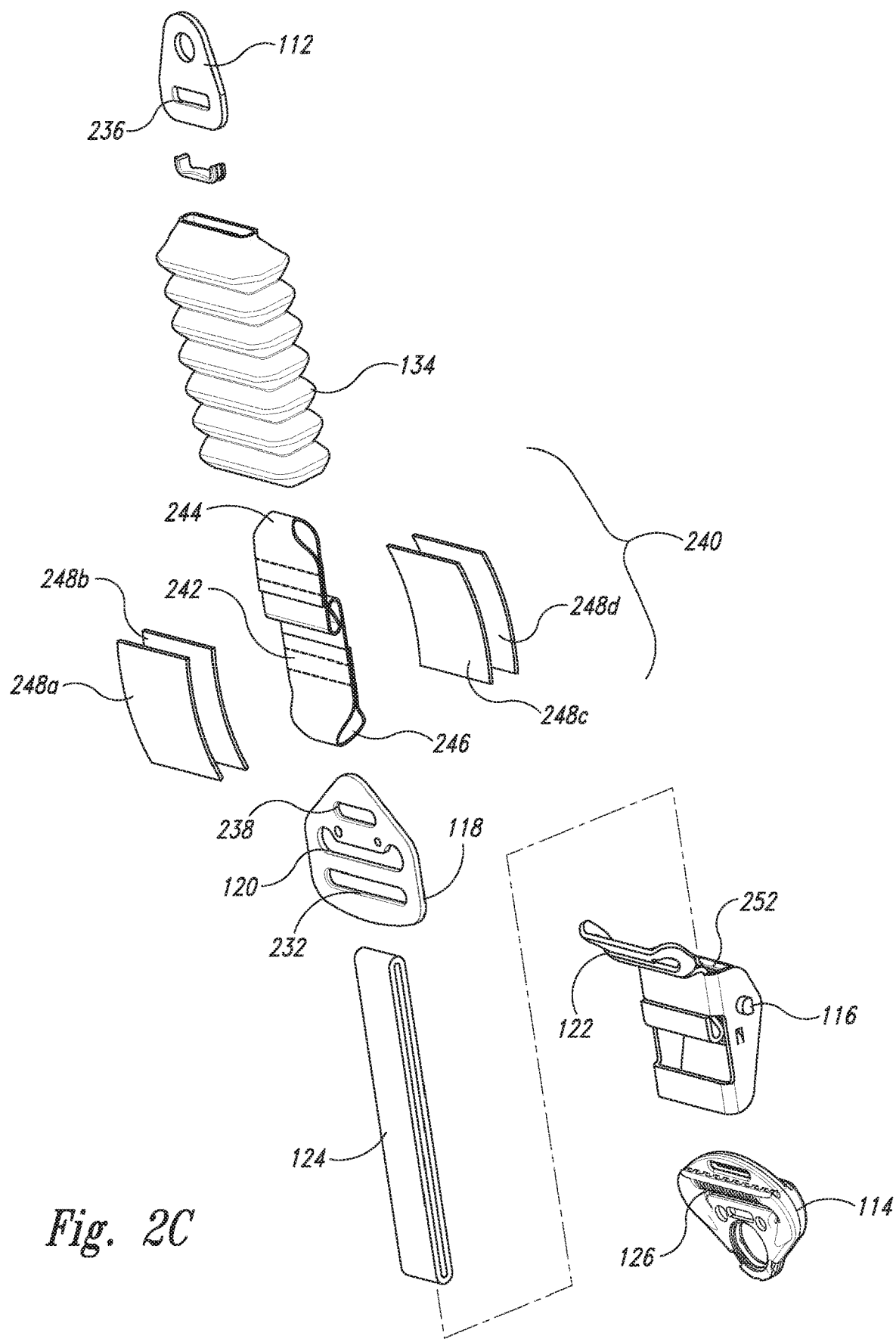
FIG. 2C is an exploded isometric view of the shock absorbing height adjuster of FIGS. 2A and 2B.
Figure 2D:
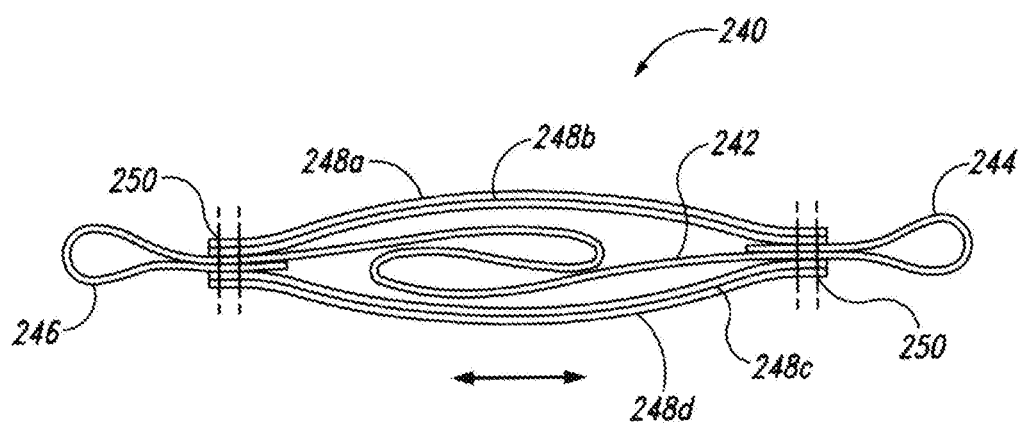
FIG. 2D is a side view of an anti-cinch feature of the shock absorbing height adjuster configured in accordance with an embodiment of the present technology.

FIG. 2A is an isometric view of the height adjuster 110 without the restraint web 106 installed, and FIG. 2B is a corresponding isometric view with the restraint web 106 installed. FIG. 2C is an exploded isometric view of the height adjuster 110, and FIG. 2D is a side view of an anti-cinch feature 240 (which can also be referred to herein as an energy absorber, energy absorbing feature, shock absorbing feature, shock absorber, etc.) configured in accordance with an embodiment of the present technology. Referring to FIG. 2A-2C together, a lower end portion of the web strap 124 extends through an aperture 230 in the two slot D-ring 114, and an upper end portion of the web strap 124 extends through an aperture 232 in the three slot D-ring 118 to secure the web strap 124 between the D-ring 114 and the D-ring 118. In the illustrated embodiment, the web strap 124 can be formed from one or more loops of sufficiently strong web material, such as conventional seat belt webbing of woven nylon. In other embodiments, the web strap 124 can be formed of a metal or composite material and can be generally rigid. The web strap 124 extends through an opening 252 in the web clamp 116 to mount the web clamp 116 to the web strap 124. As described in greater detail below, the web clamp 116 can include a releasable engagement feature that enables the web clamp to be slidably positioned at any location along the length of the web strap 124.

As shown in FIGS. 2C and 2D, the anti-cinch feature 240 includes a web 242 having a first attachment loop at a first end portion 244 and a second attachment loop at a second end portion 246. The first attachment loop extends through an aperture 236 in the upper anchor 112, and the second attachment loop extends through an aperture 238 in the three slot D-ring 118 to couple the three-slot D-ring 118 to the upper anchor 112. The anti-cinch feature 240 further includes a plurality of elastic web portions 248a-d. The elastic web portions 248 can be formed of elastic materials, such as woven elastic material, rubber, etc., and the web 242 can be a conventional seatbelt web of, for example, woven nylon. In the illustrated embodiment, the web 242 is folded over on itself to foreshorten its length, and the respective end portions of the elastic web portions 248a-d are fixedly attached to the web 242 proximate the corresponding end portions 244 and 246 by means of stitching 250 or other suitable attachment features. Accordingly, if a tension force is applied to the ends of the web 242, this force will initially be carried through the elastic web portions 248a-d, enabling the end portions 244 and 246 of the web 242 to move apart in proportion to the applied load as the elastic portions 248a-d stretch. Once the web 242 has been fully extended, however, the web 242 will carry most or at least a portion of tension load. In the illustrated embodiment, the anti-cinch feature 240 is enclosed in a resilient cover 134 that can be formed from, e.g., rubber and can protect the anti-cinch feature 240 from exposure to the elements and ingress of dirt, water, and other contaminants.

Returning to FIGS. 1 and 2B, as discussed above the first web portion 106a can extend from the web retractor 108 upwardly through the web aperture 126 in the two slot D-ring 114 before continuing upward behind the web clamp 116. From there, the web portion 106a passes through the web aperture 120 in the three slot D-ring 118 and then downwardly and through the web aperture 122 in the web clamp 116, before extending downwardly across the torso of the occupant 102.

Figure 3:
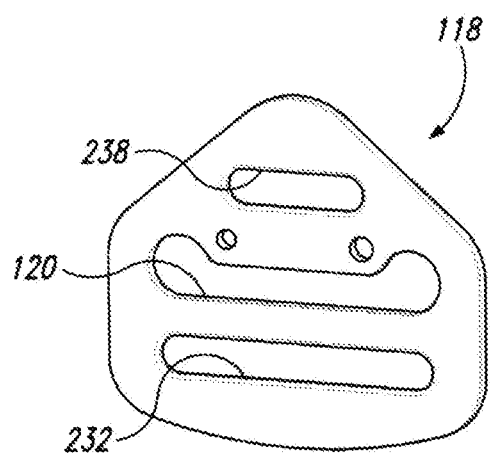
FIG. 3 is an enlarged view of a three-slot D-ring configured in accordance with an embodiment of the present technology.

FIG. 3 is an enlarged view of the three slot D-ring 118 configured in accordance with an embodiment of the present technology. As can be seen by, for example, a reference to FIGS. 2A, 2C and 3 together, the three slot D-ring 118 includes the first web aperture 232 for receiving the web strap 124, the second web aperture 120 for slidably receiving the shoulder web portion 106b of the restraint web 106, and the third web aperture 238 for coupling in the three slot D-ring 118 to the second end portion 246 of the web 242 (FIG. 2C).

Figure 4:
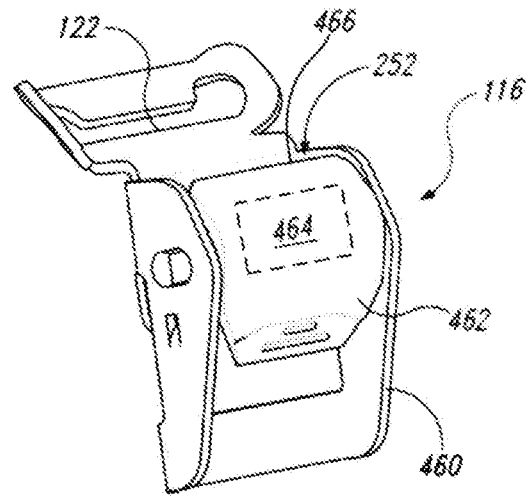
FIG. 4 is an isometric view of a web clamp configured in accordance with an embodiment of the present technology.

FIG. 4 is a rear isometric view of the web clamp 116 configured in accordance with an embodiment of the present technology. In the illustrated embodiment, the web clamp 116 includes a frame 460 that rotatably supports a release actuator 462. The release actuator 462 can be coupled to, for example, a cam member 466 that operates in a conventional manner to clamp the web clamp 116 to the web strap 124 (FIGS. 2A-2C) at any desired location along the web strap 124. In some embodiments, for example, the release actuator 462 can be depressible to rotate the cam member 466 away from the opening 252 to enable the web strap 124 to slide therethrough for repositioning of the clamp 116 along the web strap 124. Upon releasing the release actuator 462, a biasing member 464 (not shown schematically) can rotate the cam member 466 back toward the opening 252 to clamp the web strap 124 in position and prevent the web clamp 116 from moving relative to the web. Although the foregoing discussion describes one embodiment of a web clamp that can be used with the present height adjuster technology, it will be understood that the technology described herein is not limited to this particular type of web adjuster, and can be used with virtually any type of suitable web clamp or web locking device known to those of ordinary skill in the art.

Figure 5A:
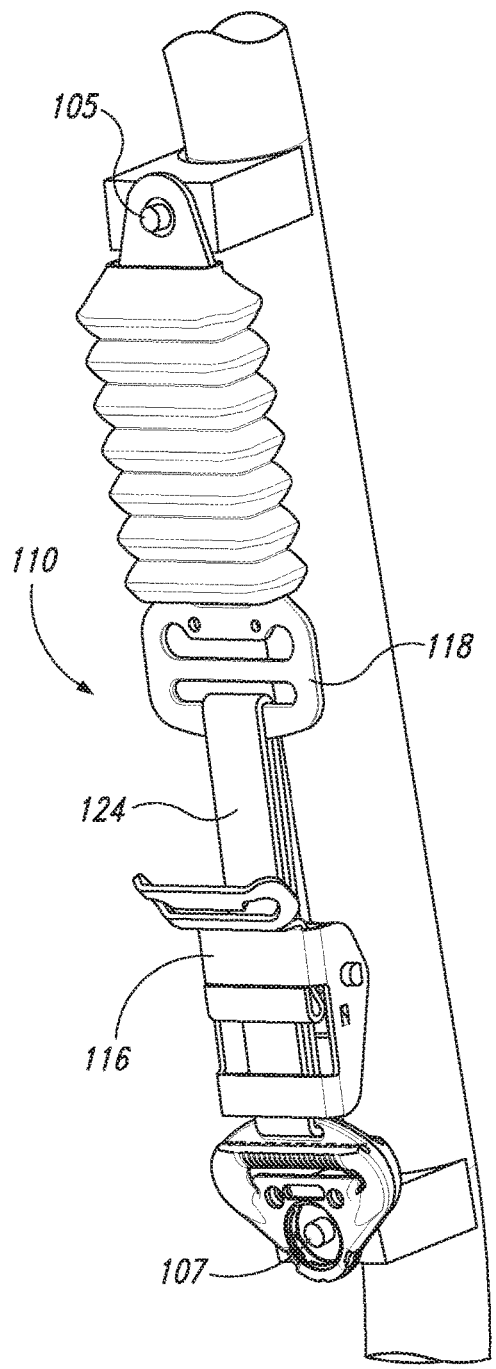
FIGS. 5A and 5B are isometric views of a shock absorbing height adjuster configured in accordance with an embodiment of the present technology and in two different operational positions.
Figure 5B:
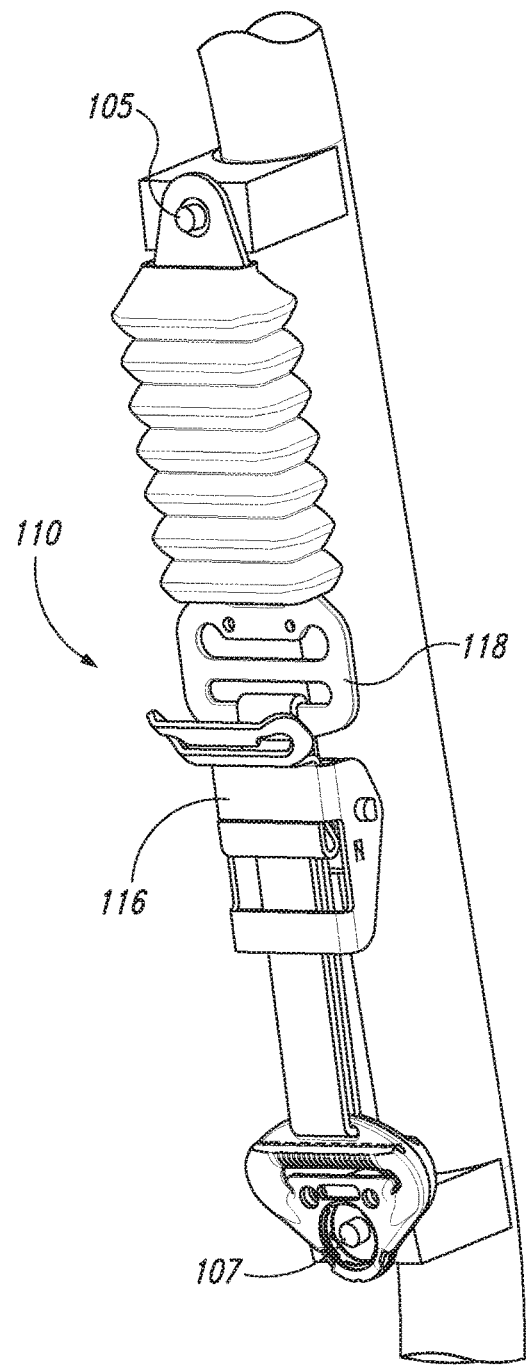

FIGS. 5A and 5B are isometric views of the height adjuster 110 in a lower position and an upper position, respectively, in accordance with embodiments of the present technology. It should be appreciated that the web clamp 116 is schematically illustrated in FIGS. 2C, 5A and 5B, and that the restraint web 106 has been omitted from FIGS. 5A and 5B for purposes of illustration. Referring to FIGS. 1-5B, to use the height adjuster 110 the seat occupant 102 can depress the release actuator 462 (obscured in FIGS. 5A and 5B) on the web clamp 116 and position the web clamp 116 at any desired location along the web strap 124 between the lower position shown in FIG. 5A and the upper position shown in FIG. 5B, so that the shoulder web portion 106b is comfortably positioned on the occupant. During vehicle operation, if the vehicle experiences shock loads that result in high tension loads in the restraint web 106 to restrain the occupant, the anti-cinch feature 240 can reduce the shock loads by enabling the three slot D-ring 118 to move resiliently downwardly in response the tension in the shoulder web portion 106b. In the event that the shock loads approach, for example, design limit loads, the elastic web portions 248a-d will fully extend, thereby enabling the web 242 to react the tension loads and prevent the restraint web 106 from extending further.

Figure 6:
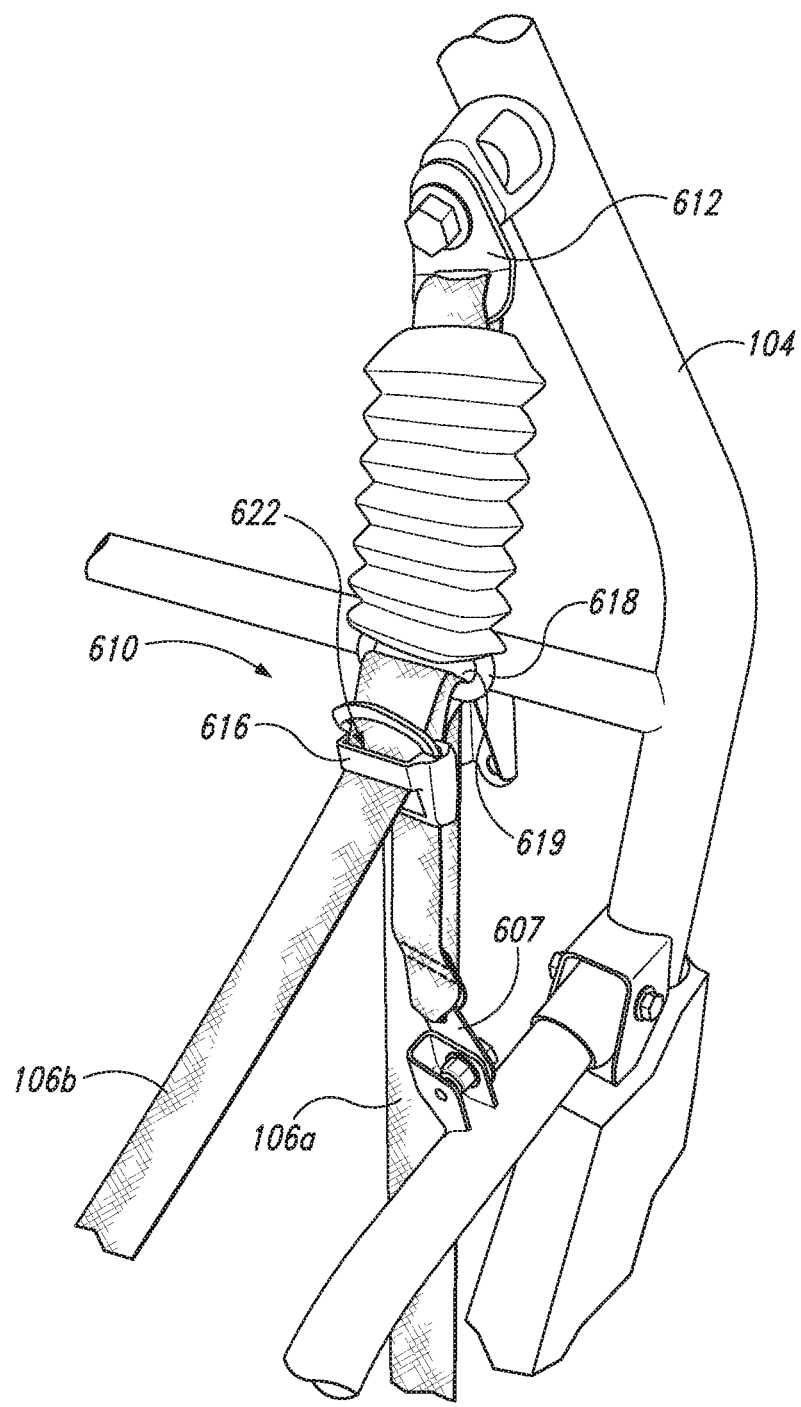
FIG. 6 is an isometric view a shock absorbing height adjuster configured in accordance with an embodiment of the present technology and installed on a vehicle.

FIG. 6 is an isometric view of a shock absorbing height adjuster 610 ("height adjuster 610") mounted to a vehicle frame 604 in accordance with another embodiment of the present technology. The height adjuster 610 is generally similar in structure and function to the height adjuster 110 described in detail above. For example, the height adjuster 610 is attached between an upper anchor 612 and a lower anchor point 607, and the first restraint web portion 106a extends upwardly through a web aperture 619 in a D-ring 618 (e.g., a two slot D-ring), and then downwardly through another web aperture 622 in a web clamp 616. As described in greater detail below with reference to FIG. 7, in the illustrated embodiment the restraint web 106 only extends through the D-ring 618 and the web aperture 622 in the web clamp 116, and does not extend through any web aperture in a lower anchor or D-ring (e.g., the two slot D-ring 114 described in detail above). Moreover, in this embodiment the restraint web 116 and the web strap 124 can both extend through the same web aperture 619 in the D-ring 618.

Figure 7:
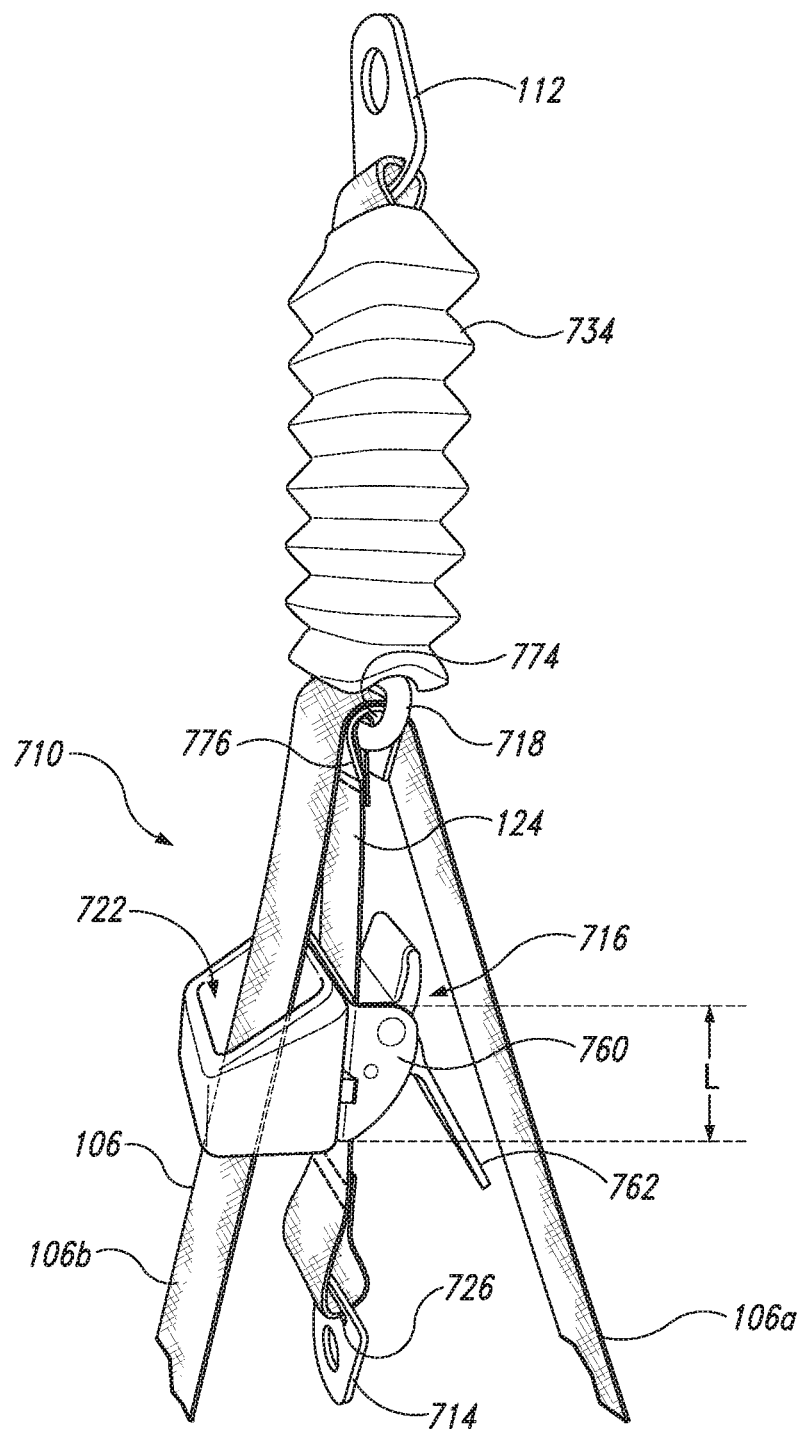
FIG. 7 is an isometric view a shock absorbing height adjuster configured in accordance with another embodiment of the present technology.

FIG. 7 is an isometric view a shock absorbing height adjuster 710 ("height adjuster 710") configured in accordance with another embodiment of the present technology. The height adjuster 710 is generally similar in structure and function to the height adjusters 110 and 610 described in detail above. For example, the height adjuster 710 includes a D-ring 718 that is operably coupled to the upper anchor 112 by means of the anti-cinch feature 240 described in detail above (not shown in FIG. 7 but understood to be enclosed within a cover 734 in FIG. 7). The height adjuster 710 also includes a web clamp 716 that is mounted to and slidable along the web strap 124. An upper end portion of the web strap 124 is attached to the D-ring 718 and a lower end portion of the web strap 124 is attached to a lower anchor 714. The height adjuster 710 is configured to be attached to an upper portion of the vehicle frame via the upper anchor 112, and to a lower portion of the vehicle frame via the lower anchor 714 (e.g., as described above with reference to FIG. 6). The web clamp 716 includes a releasable engagement feature that enables the web clamp 716 to be slidably positioned at different locations along the length of the web strap 124 to vary the position of the shoulder web portion 106b of the restraint web 106. For example, in the illustrated embodiment the web clamp 716 includes a frame 760 that rotatably supports a release actuator 762. The release actuator 762 can be coupled to, for example, a cam member that operates in a conventional manner to clamp the web clamp 716 to the web strap 124 at different locations along the web strap 124 (e.g., as described in detail above with reference to FIG. 4). The web clamp 716 further includes a web aperture 722 configured to slidably receive the restraint web 106.

In the illustrated embodiment, however, the D-ring 718 is a two slot D-ring and the lower anchor 714 includes only a single web aperture 726 for receiving and securing the lower end portion of the web strap 124 to the lower anchor 714. Accordingly, in the illustrated embodiment the first portion 106a of the restraint web 106 extends upwardly from the web retractor 108 (FIG. 1) behind the web clamp 716 and then through a web aperture 774 in the first D-ring 718 without passing through any web aperture in the lower anchor 714. From there, the second web portion 106b of the web 106 extends downwardly and passes through the web aperture 722 of the web clamp 716. Moreover, in the illustrated embodiment the web strap 124 and the restraint web 106 pass through the same web aperture 774 in the first D-ring 718. In some embodiments, the height adjuster 110 can include a protective web cover or web guard 776 around the upper end portion of the web strap 124 and configured to reduce the friction between the web strap 124 and the restraint web 106. For example, the protective web cover 776 can be a plastic or metal member that enables the restraint web 106 to slide smoothly therearound through the web aperture 774 in the first D-ring 718. In other embodiments, the first D-ring 718 can be a three slot D-ring, and the restraint web 106 and the web strap 124 can extend through separate web apertures in the three slot D-ring 718 as described in detail above. For example, the upper end portion of the web strap 124 can be attached to a first slot of the three slot D-ring (e.g., a lower slot), the restraint web can be slidably received through a second slot of the three slot D-ring (e.g., a middle slot), and the anti-cinch feature 240 can be secured to a third slot (e.g., an upper slot) of the three slot D-ring. Similarly, in some embodiments the lower anchor 714 can be a two slot D-ring as described in detail above. For example, the lower end portion of the web strap 124 can be attached to a first slot of the two slot D-ring (e.g., an upper slot) and the restraint web 124 can be slidably received through a second slot of the two slot D-ring (e.g., an upper slot).

In the illustrated embodiment, the web clamp 716 includes a web aperture 722 that is larger than the web aperture 122 of the height adjuster 110. Moreover, the web clamp 716 has a length L (e.g., in a direction along the web strap 124) that is smaller than a length of the clamp 116 of the height adjuster 110. In one aspect of the present technology, the smaller size of the web clamp 716 can allow the web clamp 716 to traverse along and be positioned at a wider range of locations along the length of the web strap 124.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A shock absorbing height adjuster for use with an occupant restraint system, the height adjuster comprising:
   an upper anchor configured to be fixedly attached to a vehicle frame;
   a D-ring having a web aperture configured to slidably receive a restraint web of the occupant restraint system;
   an anti-cinch feature operably coupling the D-ring to the upper anchor;
   a lower anchor configured to be fixedly attached to the vehicle frame;
   a web strap operably coupling the D-ring to the lower anchor; and
   a web locking device slidably coupled to the web strap, wherein the web locking device includes a web aperture and a releasable engagement feature, wherein the releasable engagement feature enables the web locking device to be locked to the web strap at different positions relative to the upper anchor, and wherein the web aperture of the locking device is configured to slidably receive the restraint web of the occupant restraint system.

2. The shock absorbing height adjuster of claim 1 wherein the web locking device is a web clamp, and wherein the releasable engagement feature includes a cam member that enables the web locking device to be clamped to the web strap at different positions relative to the anchor.

3. The shock absorbing height adjuster of claim 1 wherein the lower anchor includes a web aperture configured to slidably receive the restraint web of the occupant restraint system.

4. The shock absorbing height adjuster of claim 1 wherein the web aperture of the D-ring is a first web aperture and the D-ring further includes a second web aperture, wherein the lower anchor includes a web aperture, and wherein the web strap extends through the second web aperture in the D-ring and the web aperture in the lower anchor to couple the D-ring to the lower anchor.

5. The shock absorbing height adjuster of claim 4 wherein the web aperture of the lower anchor is a first web aperture and the lower anchor further includes a second web aperture, and wherein the second web aperture of the lower anchor is configured to slidably receive the restraint web of the occupant restraint system.

6. The shock absorbing height adjuster of claim 5 wherein the D-ring is a three slot D-ring, and wherein the lower anchor is a two slot D-ring.

7. The shock absorbing height adjuster of claim 1, further comprising the restraint web, wherein the restraint web of the occupant restraint system does not extend through any web aperture in the lower anchor.

8. The shock absorbing height adjuster of claim 1 wherein the lower anchor includes a web aperture, and wherein the web strap extends through the web aperture in the D-ring and the web aperture in the lower anchor to couple the D-ring to the lower anchor.

9. The shock absorbing height adjuster of claim 1 wherein the releasable engagement feature includes a release actuator coupled to a cam member, wherein the cam member is configured to engage the web strap to inhibit the web clamp from moving along the length of the web strap, and wherein the release actuator is movable to rotate the cam member away from the web strap to enable the web clamp to slide along the web strap.

10. The shock absorbing height adjuster of claim 8 wherein the web clamp includes a biasing member and a frame defining an opening, wherein the web strap extends through the opening in the frame, wherein the release actuator is rotatably coupled to the frame, and wherein the biasing member is configured to bias the cam member into engagement with the web strap.

11. The shock absorbing height adjuster of claim 1 wherein the anti-cinch feature is configured to enable the D-ring to move elastically downwardly relative to the upper anchor when a tension load is applied to the restraint web of the occupant restraint system.

12. The shock absorbing height adjuster of claim 1 wherein the anti-cinch feature includes—
   a web folded back on itself and having a first end portion attached to the upper anchor and a second end portion attached to the D-ring; and
   at least one elastic web portion, wherein the first and second end portions of the web are securely attached to adjacent end portions of the at least one elastic web portion, and wherein the at least one elastic web portion is configured to elastically expand when a tension load is applied to the restraint web of the occupant restraint system.

13. A height adjuster for adjusting the height of a restraint web of a vehicle occupant restraint system, the height adjuster comprising:
   an upper anchor configured to be attached to a vehicle frame;
   a lower anchor configured to be attached to the vehicle frame;
   a shock absorber having a lower end portion and an upper end portion, wherein the upper end portion of the shock absorber is coupled to the upper anchor;
   a web strap having a lower end portion and an upper end portion, wherein the lower end portion of the web strap is coupled to the lower anchor and the upper end portion of the web strap is coupled to the lower end portion of the shock absorber; and
   a web clamp configured to be adjustably positioned along the length of the web strap, wherein the web clamp includes a web aperture configured to slidably receive the restraint web extending therethrough.

14. The height adjuster of claim 13, further comprising a D-ring operably coupling the upper end portion of the web strap to the lower end portion of the shock absorber, wherein the D-ring includes a web aperture configured to slidably receive the restraint web extending therethrough.

15. The height adjuster of claim 13 wherein the lower anchor includes a web aperture configured to slidably receive the restraint web extending therethrough.

16. The height adjuster of claim 13, further comprising a D-ring operably coupling the upper end portion of the web strap to the lower end portion of the shock absorber, wherein the D-ring includes a web aperture, wherein the lower anchor includes a web aperture, wherein the lower end portion of the web strap is looped through the web aperture of the lower anchor and attached thereto, and wherein the upper end portion of the web strap is looped through the web aperture of the D-ring and attached thereto.

17. The height adjuster of claim 16 wherein the web aperture of the D-ring is configured to slidably receive the restraint web extending therethrough.

18. The height adjuster of claim 16 wherein the web aperture of the D-ring is a first web aperture and the D-ring includes a second web aperture, wherein the second web aperture is configured to slidably receive the restraint web extending therethrough.

19. The height adjuster of claim 13 wherein the web clamp includes a release actuator and a cam member coupled to the release actuator, wherein the cam member is configured to engage the web strap to inhibit the web clamp from moving along the length of the web strap, and wherein the release actuator is movable to rotate the cam member away from the web strap to enable the web clamp to slide along the length of the web strap.

20. The height adjuster of claim 13, further comprising the restraint web.

* * * * *